(12) United States Patent
Gane et al.

(10) Patent No.: US 8,066,884 B2
(45) Date of Patent: *Nov. 29, 2011

(54) PROCESS FOR THE PURIFICATION OF WATER

(75) Inventors: Patrick A. C. Gane, Rothrist (CH); Joachim Schölkopf, Killwangen (CH); Daniel Gantenbein, Gempen (CH)

(73) Assignee: Omya Development AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/449,915

(22) PCT Filed: Mar. 19, 2008

(86) PCT No.: PCT/EP2008/053339
§ 371 (c)(1),
(2), (4) Date: Nov. 13, 2009

(87) PCT Pub. No.: WO2008/113842
PCT Pub. Date: Sep. 25, 2008

(65) Prior Publication Data
US 2010/0084346 A1 Apr. 8, 2010

(30) Foreign Application Priority Data
Mar. 21, 2007 (EP) .................................. 07005854

(51) Int. Cl.
*C02F 1/28* (2006.01)
(52) U.S. Cl. ........ 210/691; 210/600; 210/660; 210/663; 210/665; 210/667

(58) Field of Classification Search .................. None
See application file for complete search history.

(56) References Cited

U.S. PATENT DOCUMENTS

| | | | |
|---|---|---|---|
| 2,613,181 A | 10/1952 | Green et al. | |
| 4,343,706 A * | 8/1982 | Etzel et al. | 210/667 |
| 4,416,780 A * | 11/1983 | Disselbeck | 210/617 |
| 6,210,526 B1 | 4/2001 | Pohlen | |
| 6,666,953 B1 | 12/2003 | Gane et al. | |
| 2003/0196966 A1 | 10/2003 | Hughes | |

(Continued)

FOREIGN PATENT DOCUMENTS
CZ 9300287 A3 1/1995
(Continued)

OTHER PUBLICATIONS

Teir et al. "production of precipitated calcium carbonate from calcium silicates and carbon dioxide". 2005. Energy Conversion and Management. vol. 46. pp. 2954-2979.*

(Continued)

*Primary Examiner* — Yelena G Gakh
*Assistant Examiner* — David Weisz
(74) *Attorney, Agent, or Firm* — Amster, Rothstein & Ebenstein LLP; Craig J. Arnold (57) ABSTRACT

The present invention relates to a process for the purification of water by adding surface-reacted natural calcium carbonate or an aqueous suspension comprising surface-reacted calcium carbonate and having a pH greater than 6.0 measured at 20° C., to the medium, wherein the surface-reacted calcium carbonate is a reaction product of natural calcium carbonate with carbon dioxide and one or more acids and the use of the surface-reacted natural calcium carbonate for this process.

33 Claims, 7 Drawing Sheets

U.S. PATENT DOCUMENTS

| | | |
|---|---|---|
| 2004/0020410 A1 | 2/2004 | Gane |
| 2004/0238454 A1 | 12/2004 | Mori et al. |
| 2005/0175577 A1 | 8/2005 | Jenkins et al. |
| 2006/0048908 A1 | 3/2006 | Wang et al. |

FOREIGN PATENT DOCUMENTS

| | | |
|---|---|---|
| EP | 0 989 229 A1 | 3/2000 |
| EP | 1 186 343 A1 | 3/2002 |
| EP | 1607373 | 12/2003 |
| GB | 662646 | 8/1948 |
| JP | 2000/140834 | 5/2000 |
| JP | 2002/346572 | 12/2002 |
| WO | WO 00/39222 A | 7/2000 |
| WO | WO 02/064703 | 8/2002 |
| WO | WO 2004/083316 A | 9/2004 |
| WO | WO 2005/042412 A1 | 5/2005 |

OTHER PUBLICATIONS

International Search Report for PCT Application No. PCT/EP2008/053339.

Written Opinion of the International Searching Authority for PCT Application No. PCT/EP2008/053339.

Tsai et al. "Adsorption of bisphenol-A from aqueous solution onto minerals and carbon adsorbents." J. of Hazardous Materials, 134:1-3 (2006), pp. 169-175.

Zhang et al. "Removal of estrone and 17B-estradiol from water by adsorption." Water Research 39 (2005) pp. 3991-4003.

Snyder et al. Role of Membranes and Activated Carbon in the Removal of Endocrine Disruptors and Pharmaceuticals. Desalination 202 (2007) 156-181.

* cited by examiner

PROCESS FOR THE PURIFICATION OF WATER

This is a U.S. national phase of PCT Application No. PCT/EP2008/053339, filed Mar. 19, 2008, which claims the benefit of European Application No. 07005854.0, filed Mar. 21, 2007.

The present invention relates to a process for the purification of water and the use of surface-reacted natural calcium carbonate in such a process.

There is a wide range of water purification techniques that can be used to remove fine solids, micro-organisms and dissolved inorganic and organic materials. The choice of method will depend on the quality of the water being treated, the cost of the treatment process and the quality standards expected of the processed water.

Flocculation is widely employed in the purification of water such as industrial waste water or drinking water. Flocculation refers to a process where dissolved compounds and/or colloidal particles are removed from the solution in the form of flocs or "flakes." The term is also used to refer to the process by which fine particulates are caused to clump together into flocs. The flocs may then float to the top of the liquid, settle to the bottom of the liquid, or can be readily filtered from the liquid.

Common flocculants or coagulants used are aluminium sulphate or polyaluminum chloride (PAC). Aluminium sulphate reacts with water to form flocs of aluminium hydroxide. Coagulation with aluminum compounds may leave a residue of aluminium in the finished water. Aluminium can be toxic to humans at high concentrations. In solutions of poly-aluminium chloride (PAC), aluminium ions have formed into polymers consisting of clusters of ions bridged by oxygen atoms. PAC is used e.g. for the treatment of brown drinking water comprising organic materials such as leaves and/or inorganic materials such as iron and manganese compounds which cause the brown discolouration. However, PAC is generally not sufficient to remove all brown discolouration from the water.

Iron(III) chloride is another common coagulant. Iron(III) coagulants work over a larger pH range than aluminium sulphate but are not effective with many source waters. Coagulation with iron compounds typically leaves a residue of iron in the finished water. This may impart a slight taste to the water, and may cause brownish stains on porcelain fixtures. Furthermore, iron(III) chloride presents corrosion risks in the water treatment system.

Further well-known adsorbents for the water treatment based on a high specific surface area such as activated carbon or bentonite have the general drawback that they are very difficult to separate after the adsorption of the substance to be removed from the medium due to their finely divided state.

Thus, considering the drawbacks of known agents for water purification mentioned above, it is an object of the present invention to provide an improved water purification process providing for an efficient removal of water impurities.

The object outlined above has been solved by a process for the purification of water, wherein surface-reacted natural calcium carbonate or an aqueous suspension comprising surface-reacted natural calcium carbonate and having a pH of greater than 6.0, measured at 20° C., is added to the water to be purified, the surface-reacted natural calcium carbonate being the reaction product of a natural calcium carbonate with carbon dioxide and one or more acids.

The term "purification" is to be interpreted broadly and means any removal of harmful compounds and/or other compounds not tolerated in the water.

The water preferably treated by the process of the present invention includes industrial waste water, drinking water, urban waste water, waste water from breweries or other beverage industries or water in the paper industry, be it white or waste water, as well as agricultural waste-water.

The surface-reacted natural calcium carbonate as defined above and further below is efficiently adsorbing organic as well as inorganic impurities on its surface.

The surface-reacted natural calcium carbonate to be used in the process of the present invention is obtained by reacting a natural calcium carbonate with an acid and with carbon dioxide.

Preferably, the natural calcium carbonate is selected from the group comprising marble, chalk, calcite, dolomite, limestone and mixtures thereof. In a preferred embodiment, the natural calcium carbonate is ground prior to the treatment with an acid and carbon dioxide. The grinding step can be carried out with any conventional grinding device such as a grinding mill known to the skilled person.

The surface-reacted natural calcium carbonate to be used in the water purification process of the present invention is prepared as an aqueous suspension having a pH, measured at 20° C., of greater than 6.0, preferably greater than 6.5, more preferably greater than 7.0, even more preferably greater than 7.5. As will be discussed below, the surface-reacted natural calcium carbonate can be brought into contact with the water to be purified by adding said aqueous suspension to the water. It is also possible to modify the pH of the aqueous suspension prior to its addition to the water to be purified, e.g. by dilution with additional water. Alternatively, the aqueous suspension can be dried and the surface-reacted natural calcium carbonate brought into contact with the water is in powder form or in the form of granules. In other words, the increase of pH to a value of greater than 6.0 subsequent to treatment with an acid and carbon dioxide is needed to provide the surface-reacted calcium carbonate having the beneficial adsorption properties described herein.

In a preferred process for the preparation of the aqueous suspension, the natural calcium carbonate, either finely divided, such as by grinding, or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step, an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $HSO_4^-$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step, the natural calcium carbonate is treated with carbon dioxide. If a strong acid such as sulphuric acid or hydrochloric acid is used for the acid treatment of the natural calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater that 6 by adding a base subsequent to carbon dioxide treatment. Any conventional base such as sodium hydroxide or potassium hydroxide can be used.

With the process steps described above, i.e. acid treatment, treatment with carbon dioxide and pH adjustment, a surface-reacted natural calcium carbonate is obtained having good adsorption properties for organic as well as inorganic impurities which might be present in waste water.

Further details about the preparation of the surface-reacted natural calcium carbonate are disclosed in WO 00/39222 and US 2004/0020410 A1, wherein the surface-reacted natural calcium carbonate is described as a filler for paper manufacture, the content of these references herewith being included in the present application.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

The surface-reacted natural calcium carbonate can be kept in suspension, optionally further stabilised by a dispersant. Conventional dispersants known to the skilled person can be used. The dispersant can be anionic or cationic. A preferred dispersant is polyacrylic acid.

Alternatively, the aqueous suspension described above can be dried, thereby obtaining the surface-reacted natural calcium carbonate in the form of granules or a powder.

In a preferred embodiment, the surface-reacted natural calcium carbonate has a specific surface area of from 5 $m^2/g$ to 200 $m^2/g$, more preferably 20 $m^2/g$ to 80 $m^2/g$ and even more preferably 30 $m^2/g$ to 60 $m^2/g$, measured using nitrogen and the BET method according to ISO 9277.

Furthermore, it is preferred that the surface-reacted natural calcium carbonate has a mean grain diameter of from 0.1 to 50 μm, more preferably from 0.5 to 25 μm, even more preferably 1 to 10 μm, measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

In a preferred embodiment, the surface-reacted natural calcium carbonate has a specific surface area within the range of 15 to 200 $m^2/g$ and a mean grain diameter within the range of 0.1 to 50 μm. More preferably, the specific surface area is within the range of 20 to 80 $m^2/g$ and the mean grain diameter is within the range of 0.5 to 25 μm. Even more preferably, the specific surface area is within the range of 30 to 60 $m^2/g$ and the mean grain diameter is within the range of 0.7 to 7 μm.

In the process of the present invention, the surface-reacted natural calcium carbonate is brought into contact with the water to be purified, e.g. industrial waste water, drinking water, urban waste water, waste water from breweries or other beverage industries or water in the paper industry, be it white or waste water, as well as agricultural waste-water by any conventional means known to the skilled person.

The surface-reacted natural calcium carbonate can be added as an aqueous suspension, e.g. the suspension described above. Alternatively, it can be added in solid form, e.g. in the form of granules or a powder or in the form of a cake. Within the context of the present invention, it is also possible to provide an immobile phase comprising the surface-reacted natural calcium carbonate, the water to be purified running through said immobile phase, e.g. in the form of a cake or layer, comprising the surface-reacted natural calcium carbonate, the water to be purified running through said immobile phase. This will be discussed in further detail below.

In a preferred embodiment, the pH of the water to be treated is adjusted to a value of greater than 6.0, more preferably greater than 6.5, and even more preferably greater than 7.0 prior to the addition of the surface-reacted calcium carbonate.

Preferably, the surface-reacted natural calcium carbonate is suspended in the water, e.g. by agitation means. The amount of surface-reacted natural calcium carbonate depends on the type of water to be treated as well as on the type and amount of impurities. Preferably an amount of 10 ppm-1 wt.-%, preferably 100 ppm-0.5 wt.-%, more preferably 400 ppm-2000 ppm. surface-reacted natural calcium carbonate, based on the weight of the water to be treated, is added.

The water may contain organic impurities, e.g. resulting from human waste, organic materials, soil, surfactants as well as inorganic impurities, in particular heavy metal impurities such as iron- or manganese-containing compounds. Harmful components that can be removed from the water with the purification process of the present invention also include microorganism such as bacteria, fungi, archaea, or protists.

Further harmful substances such as polycyclic compounds, cholesterol, or endocrine disrupting compounds (EDCs), such as e.g. endogenous hormones such as 17β-estradiol (E2), estrone (E1), estriol (E3), testosterone or dihydro testosterone; phyto and myco hormones such as β-sitosterol, genistein, daidzein or zcralcon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB. Furthermore iodised contrast agents for X-ray-analysis e.g. ioxithalamate, fluorochinolones like ciprofoxacine and antibiotics like macrolides and sulfonamides can be removed by the process of the present invention.

It has also been found that surface-reacted calcium carbonate very efficiently adsorbs activated carbon powder alone as well as activated carbon powder which has already adsorbed substances. As outlined above, activated carbon is a well-known potent adsorbent, having however the drawback that the adsorption very often is not very fast and that its removal from the medium to be treated is very difficult due to its fine division in the medium.

The resulting composites, however, comprising surface-reacted calcium carbonate, activated carbon, and, optionally, further substances like impurities adsorbed to the carbon surface, can be easily separated from the water to be purified.

The use of surface-reacted calcium carbonate together with activated carbon on the one hand provides for a very efficient adsorption of impurities, such as the substances mentioned above, by the excellent adsorption properties of both of the adsorbents, and on the other hand additionally improves the removability of activated carbon by forming composites therewith, also if it has already substances, e.g. the substances mentioned above as impurities, adsorbed onto its surfaces, resulting in a further improved removal of impurities due to the synergistic interaction between surface-reacted calcium carbonate and activated carbon, the resulting composites being easily separable from the aqueous medium.

In this respect it is especially preferred that the activated carbon is added to the aqueous medium prior to the addition of the surface-reacted natural calcium carbonate. In this embodiment, the substances are essentially first adsorbed to the activated carbon and the resulting composite is essentially subsequently adsorbed by the surface-reacted calcium carbonate providing for an improved removability of the activated carbon, and the impurities attached thereto, respectively.

Any activated carbon known in the art can be used in the process of the present invention. Examples of activated carbons useful in the present invention are e.g. available from Fluka, such as article No. 05112 (p.a. for gc; grain size 0.3 to 0.5 mm; bulk density 410 kg/m$^3$), from Aldrich such as article number 484156 (glassy spherical powder, grain size 10-40 μm), from Sigma-Aldrich such as article No. 242276 (Darco® G-60, powder, −100 mesh particle size); from Riedel-de Haen (article No. 18002, purum, granulated), or Lurgi Hydrafin CC 8×30 (Donau Carbon GmbH & Co. KG, Frankfurt am Main, Germany) or activated carbon available from Fluka (article No. 05112).

For example, the activated carbon particles can have a grain size of 0.1 μm to 5 mm, preferably 10 μm to 2 mm, 0.1 mm to 0.5 mm, e.g. 0.3 mm.

Preferably, the weight ratio of the surface-reacted natural calcium carbonate to the activated carbon is from 1:1 to 100:1, more preferably from 5:1 to 80:1, especially 10:1 to 70:1 or 20:1 to 50:1, e.g. 30:1 or 40:1.

Optionally, additives can be added to the water sample to be treated. These might include agents for pH adjustment and conventional flocculants such as polyaluminium chloride, iron chloride or aluminium sulphate.

In a preferred embodiment, a natural calcium carbonate which has not been surface-reacted as described above is added as well.

After the adsorption has been completed, the resulting composite can be separated from the water sample by conventional separation means known to the skilled person such as sedimentation and filtration.

In an alternative approach, the liquid to be purified is preferably passed through a permeable filter comprising the surface-reacted natural calcium carbonate and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising of a number of tortuous passages of varying diameter and configuration retains impurities by molecular and/or electrical forces adsorbing the impurities onto the surface-reacted natural calcium carbonate which is present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

One option to introduce a depth filtration layer onto the surface filter is to suspend a flocculating aid in the liquid to be filtered, allowing this aid to subsequently decant such that it flocculates all or part of the impurities as it is deposited on a surface filter, thereby forming the depth filtration layer. This is known as an alluvium filtration system. Optionally, an initial layer of the depth filtration material may be pre-coated on the surface filter prior to commencing alluvium filtration.

The following figures, examples and tests will illustrate the present invention, but are not intended to limit the invention in any way.

EXAMPLES

The type and amount of impurities which are present in the water samples before and after treatment according to the process of the present invention were determined using Optima 3200 XL ICP-OES instrumentation from Perkin-Elmer. The samples were directly analysed following treatment with SRCC.

Example 1

In example 1, the adsorption capacity of the surface-reacted natural calcium carbonate with regard to different heavy metals is determined.

500 g of a heavy metal solution, containing 5 ppm each of cadmium, chromium, copper, mercury, nickel, and lead was stirred for 15 minutes with 3% (w/w %) surface-reacted natural calcium carbonate. The solution was left for 24 hours at pH 11.5 and the upper liquid phase was analysed with ion chromatography (Dionex DX 120 Ion-Chromatograph).

The surface-reacted natural calcium carbonate was prepared as follows:

A finely divided natural calcium carbonate originating from Omey, France, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 35 $m^2/g$ according to ISO standard 92777, and an approximate number average diameter of 10 micrometers estimated from scanning electron microscope images obtained using a LEO 435 VPe scanning electron microscope.

TABLE 1

Treatment of heavy metal ion solution with surface-reacted calcium carbonate

| | Amount of cadmium (ppm) | Amount of chromium (ppm) | Amount of copper (ppm) | Amount of mercury (ppm) | Amount of nickel (ppm) | Amount of lead (ppm) |
|---|---|---|---|---|---|---|
| Untreated solution | 5.0 | 5.0 | 5.0 | 5.0 | 5.0 | 5.0 |
| Solution after treatment | <0.1 | <0.1 | <0.1 | <0.1 | 0.5 | <0.1 |
| Sediment obtained after treatment | 2.6 | 2.5 | 3.2 | 2.1 | 3.7 | 2.6 |

It is obvious that the surface-reacted natural calcium carbonate was able to reduce cadmium, chromium, copper, mercury, and lead very efficiently. From the originally dissolved 5 ppm, less than 0.1 ppm was recovered in the treated sample. For nickel, 90% of the starting amount of 5 ppm was adsorbed and thus removed from the solution.

Example 2

In Example 2, the adsorption capacity of the surface-reacted natural calcium carbonate with regard to microorganisms is determined.

A barm suspension of 100 ppm was used with a germ count of $6*10^5$ cfu/cm$^3$. In a first experiment, the barm suspension was filtered through a blue band paper filter. In a second experiment, the suspension was filtered through a layer made of the surface-reacted natural calcium carbonate, the layer having a diameter of 90 mm and a thickness of 30 mm.

The surface-reacted natural calcium carbonates was prepared as follows:

Two samples were tested and provided the same results within 0.5%.

First Surface-Reacted Natural Calcium Carbonate:

A finely divided natural calcium carbonate originating from Omey, France, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 35 $m^2/g$ according to ISO standard 92777, and an approximate number average diameter of 10 micrometers estimated from scanning electron microscope images obtained using a LEO 435 We scanning electron microscope.

Second Surface-Reacted Natural Calcium Carbonate:

A finely divided natural calcium carbonate originating from Molde, Norway, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 50 $m^2/g$ according to ISO standard 92777, and an approximate number average diameter of 20 micrometers estimated from scanning electron microscope images obtained using a LEO 435 VPe scanning electron microscope.

The results are shown in Table 2.

TABLE 2

Filtration of barm suspension through different filter materials

| | Germ count of suspension (cfu/ml) |
|---|---|
| Untreated suspension | $6*10^5$ |
| Suspension after filtering through paper filter | $6*10^5$ |
| Suspension after filtering through filter layer made of surface-reacted calcium carbonate | $7*10^3$ |

The results indicate that the use of the surface-reacted natural calcium carbonate reduced the germ count by a factor of 100.

Example 3

In Example 3, river water was subjected to the purification method of the present invention. 100 ppm surface-reacted natural calcium carbonate and 4 ppm polyaluminum chloride were suspended in a river water sample. After two minutes, the flocculated solids were filtered off and the filtrate was analysed for its content of iron and manganese.

The surface-reacted natural calcium carbonate used in Example 3 was prepared as follows:

A finely divided natural calcium carbonate originating from Vermont, U.S.A, containing 800 ppm of magnesium oxide and 2500 ppm anionic polyacrylate dispersant per equivalent dry gram of calcium carbonate, was suspended to achieve a suspension of approximately 16% by weight of dry calcium carbonate. The slurry thus formed is then treated by slow addition of phosphoric acid at a temperature of approximately 55° C., sufficient to provide a product featuring a BET specific surface area of 68 $m^2/g$ according to ISO standard 92777, and a d50 of 10 micrometers measured by means of the Sedigraph™ 5100 from Micromeritics™.

The results are summarized in Table 3.

TABLE 3

Treatment of river water with surface-reacted calcium carbonate

| | Amount of iron (mg/l) | Amount of manganese (mg/l) |
|---|---|---|
| River water sample before treatment | 2.03 | 0.88 |
| River water sample after treatment | 0.023 | 0.104 |

The results clearly indicate that treatment with the surface-reacted natural calcium carbonate significantly reduces the amounts of heavy metal ions such as iron and manganese.

Example 4

A suspension of approximately 25 wt.-% based on the dry weight of finely divided natural calcium carbonate originating from Omey, France, was prepared. The slurry thus formed was then treated by slow addition of phosphoric acid at a temperature of approximately 55° C.

The resulting slurry had a BET specific surface area of 60 $m^2/g$ according to ISO standard 92777, and a $d_{50}$ of about 7 μm measured by means of the Sedigraph™ 5100 from Micromeritics™.

1. Adsorption of 17α-ethinylestradiol

17α-ethinylestradiol (EE2) (>98% pure) was used, which is supplied by Sigma Aldrich (Bornem, Belgium) (article No. E4876).

a) Preparation of the Test Mixture

Figure 1:
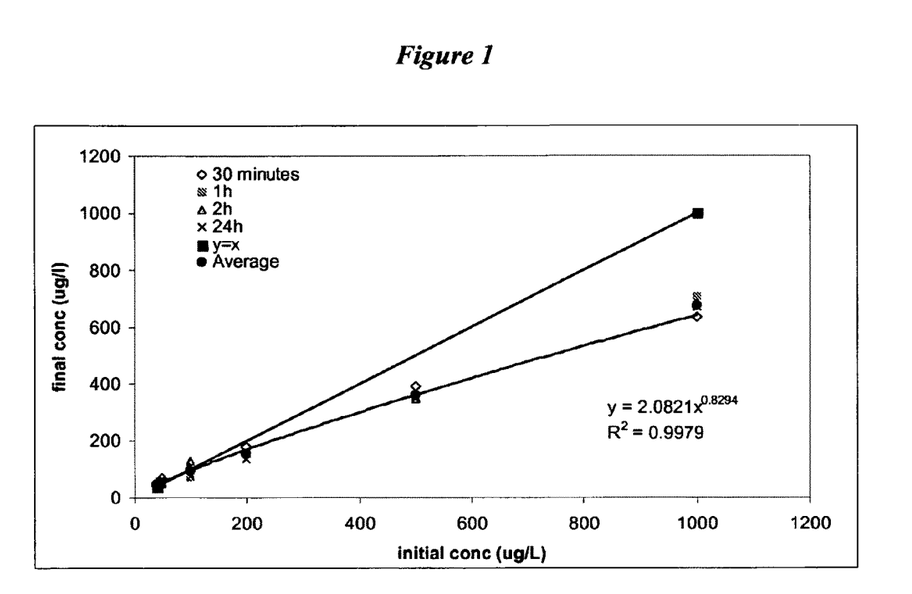
FIG. 1 shows the adsorption behaviour of 17α-ethinylestradiol on SRCC for different equilibration times.

A standard experiment was performed using the following procedure:

0.4 g SRCC suspension having a solids content of 25 Gew.-% was added to 7 ml of 17α-ethinylestradiol solution having different concentrations of 50, 100, 200, 500 and 1000 μg/l and shaken for 30 min., 1 h, 2 h and 24 h at 25° C.

b) Determination of the Equilibrium Concentration in the Adsorption of 17α-Ethinylestradiol onto the Surface of Surface-Reacted Calcium Carbonate For the determination of the equilibrium concentration of 17α-ethinylestradiol with respect to the adsorption onto the surface of SRCC, the initial and final concentration after the addition of SRCC was measured at certain concentrations and treatment (shaking) times. It can be taken from FIG. 1 that the adsorption of 17α-ethinylestradiol onto the surface of SRCC was very fast and no change was observed after 30 minutes for any concentration, which indicates that the adsorption equilibrium is reached after 30 minutes, independently from the concentration.

The concentration was determined by the well-known method of HPLC (Column: Gemini 5 um C18/ODS C18; Eluent A: Water (45%); Eluent B: Acetonitrile 55%; Eluent Type Isocratic; Flow 1 ml/min; Temp. 25° C.; Detection: UV-Vis Absorption@ 205 nm)

c) Determination of Adsorption Isothermis of 17α-Ethinylestradiol for Several Adsorbents For determining the efficiency of 17α-ethinylestradiol adsorption the adsorption isotherms were determined.

After the equilibrium time, the SRCC is separated from the liquid phase by settling, filtration or centrifugation. The concentration in the upper liquid phase is determined by the above described HPLC method, resulting in the equilibrium concentration. The lower solid phase is isolated by decantation of the supernatant phase. The SRCC is dissolved in a certain amount of hydrochloric acid and the concentration measured with the above mentioned method, resulting in the adsorbed amount per amount SRCC.

Based on the findings above, an equilibrium time of 1 h was used for the determination of the adsorption isotherm of 17α-ethinylestradiol with respect to SRCC.

Furthermore, the adsorption isotherm for activated carbon acting as the adsorbent was determined. The data for the activated carbon were measured after 16 hours. The activated carbon used was the commercially available Lurgi Hydrafin CC 8×30 (Donau Carbon GmbH & Co. KG, Frankfurt am Main, Germany). It has a grain size of 0.5 to 2.5 mm and a density of 480±50 $kg/m^3$.

Figure 2:
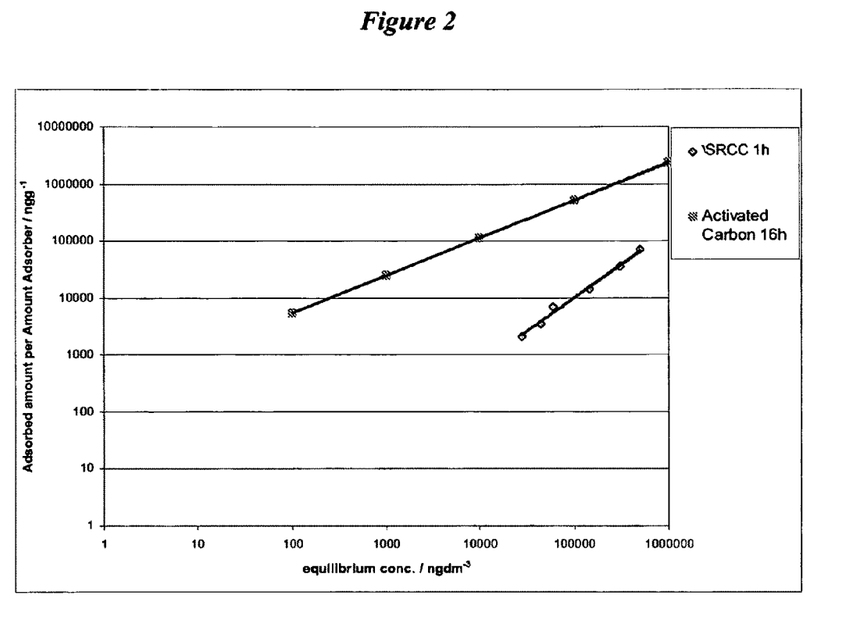
FIG. 2 shows the adsorption isotherms for the adsorption of 17α-ethinylestradiol on SRCC, activated carbon and manganese dioxide in terms of the adsorbed amount per amount of adsorbent.

From FIG. 2, it can be taken that in terms of the adsorbed amount of 17α-ethinylestradiol per amount of adsorbent in ng/g, the activated carbon is superior in 17α-ethinylestradiol adsorption.

Figure 3:
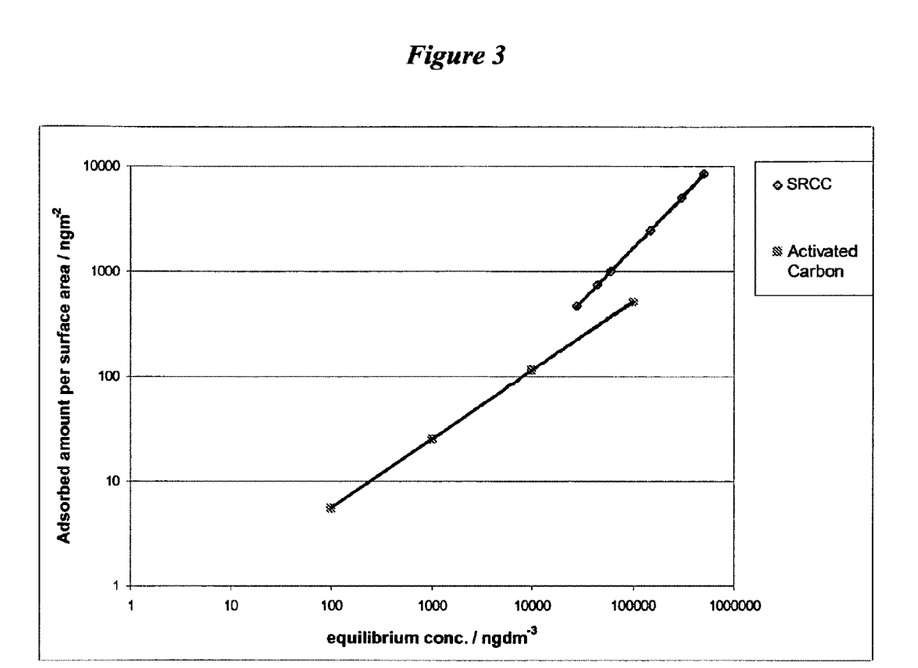
FIG. 3 shows the adsorption isotherms for the adsorption of 17α-ethinylestradiol on SRCC, activated carbon and manganese dioxide in terms of the adsorbed amount per surface area of adsorbent.

However, in terms of adsorbed amount of 17α-ethinylestradiol per surface area of adsorbent as given in FIG. 3, it can be seen that SRCC shows the same level of efficiency in 17α-ethinylestradiol adsorption, which is markedly higher than that of activated carbon.

These findings show that less activated carbon in terms of weight amount might be needed for adsorbing 17α-ethinylestradiol, but that SRCC is more effective in terms of its surface area, i.e. although it has a lower specific surface area, more estrogen per surface area is adsorbed.

Furthermore, it was found that the use of SRCC together with activated carbon shows an unexpected synergy.

2. Adsorption of Activated Carbon

As mentioned in the description, activated carbon cannot be separated easily from water. However, surface-reacted calcium carbonate is able to clarify an activated carbon suspension nicely simplifying the separation of the active carbon.

Activated carbon, which is commercially available from Fluka (article No. 05112 (p.a. for gc; grain size 0.3 to 0.5 mm; bulk density 410 $kg/m^3$) and the SRCC were subjected to the following treatment:

0.02 g activated carbon was added to 30 g water. Then, 0.2 g SRCC was added, and the resulting mixture was shaken for 2 min. The mixture was allowed to settle. Subsequently, the upper phase was separated by decanting.

Figure 4:
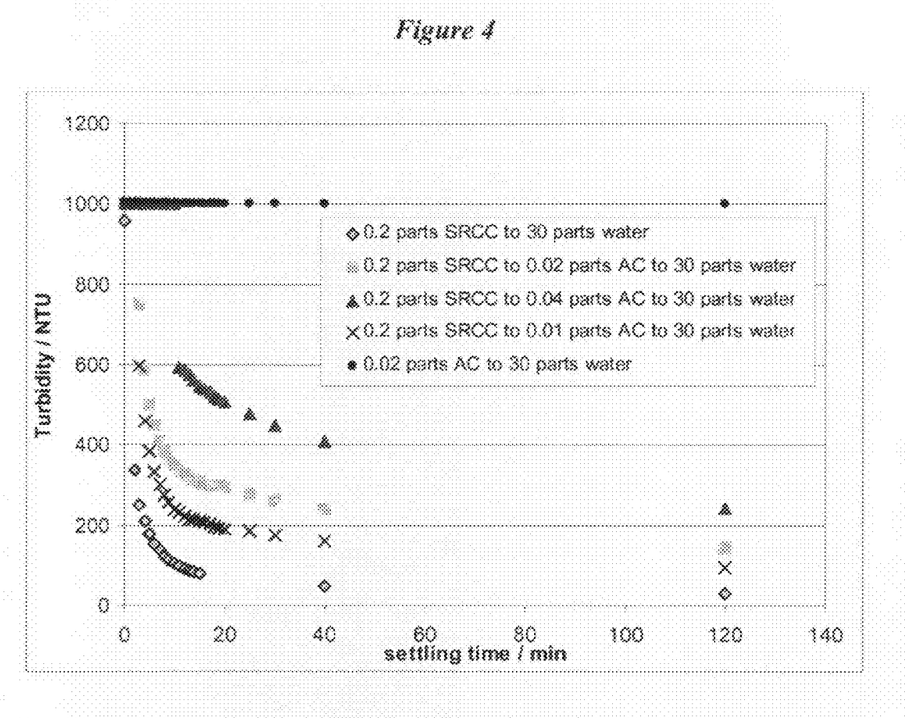
FIG. 4 shows the turbidity reduction by the adsorption of activated carbon by SRCC

From FIG. 4, it can be taken that turbidity of the upper liquid phase could be significantly reduced. The turbidity of pure activated carbon was constantly above 1000 NTU which is the maximal value which can be measured with this device (a Hach 2100P iso Turbidimeter).

The resulting composites can be easily separated, e.g. by filtration.

Figure 5:
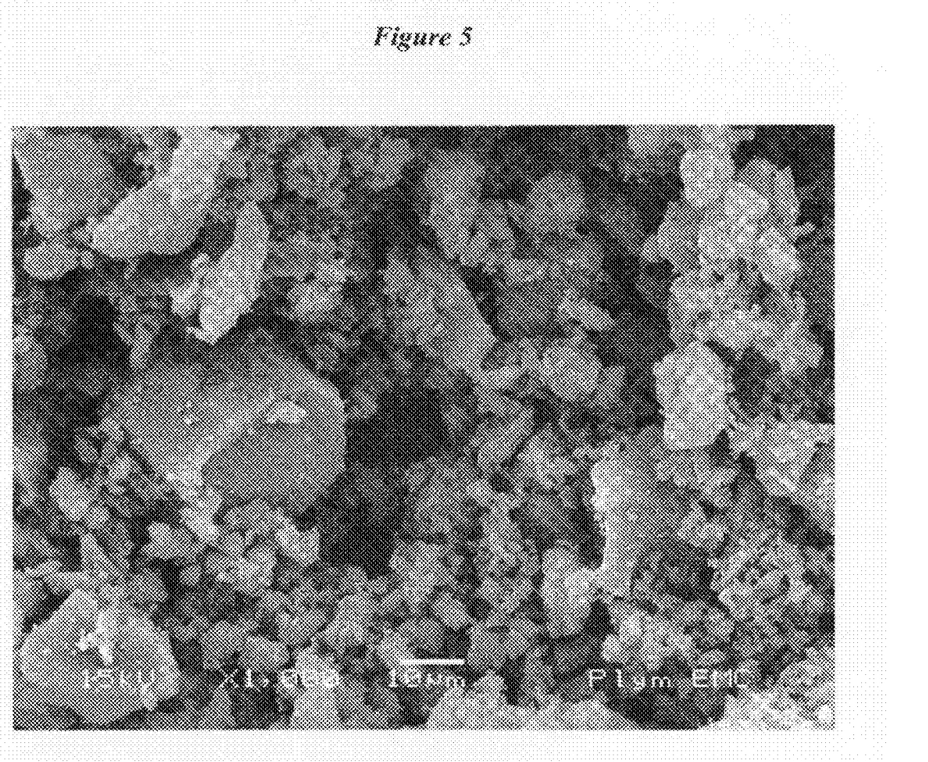
FIG. 5 shows a SEM image of activated carbon.

FIG. 5 shows a SEM image of activated carbon.

Figure 6:
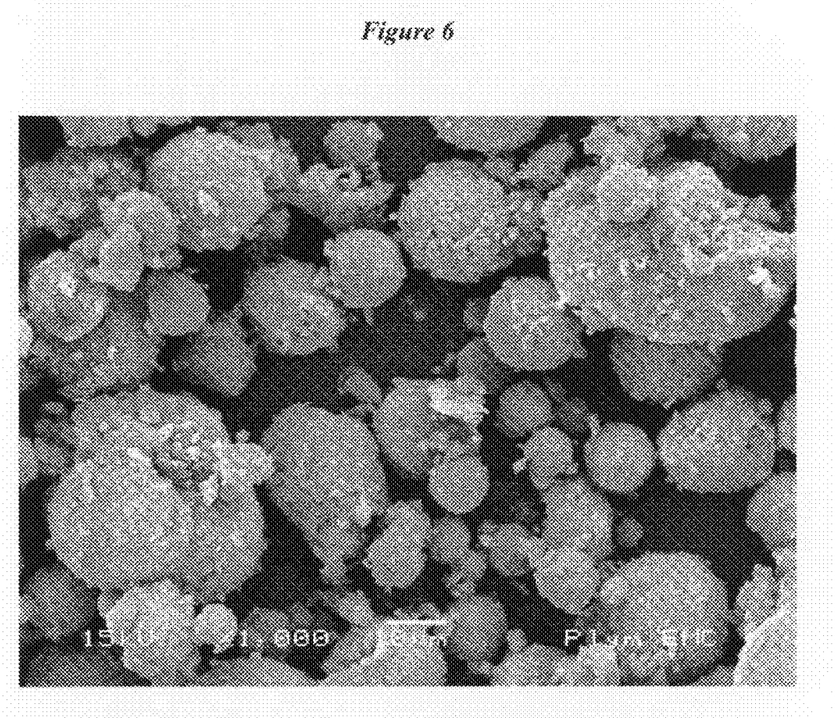
FIG. 6 shows a SEM image of activated carbon and the SRCC.
Figure 7:
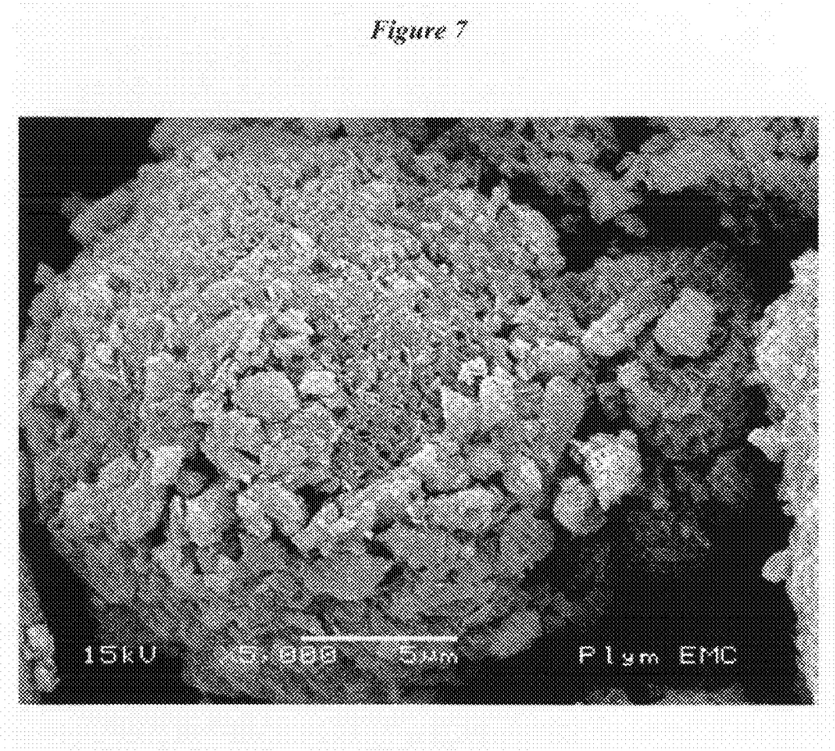
FIG. 7 shows an enlargement of FIG. 6.

FIG. 6 shows a SEM image of activated carbon and the SRCC. FIG. 7 shows an enlargement of FIG. 6.

The invention claimed is:

1. A process for the purification of water comprising (a) contacting the water to be purified with (i) surface-treated natural calcium carbonate or (ii) an aqueous suspension comprising surface-treated natural calcium carbonate having a pH of greater than 6.0 measured at 20° C., so that the surface-treated natural calcium carbonate absorbs impurities in the water, wherein the surface-treated natural calcium carbonate is formed by treating a natural calcium carbonate with carbon dioxide and one or more acids, and (b) separating the surface-treated natural calcium carbonate with absorbed impurities from the water.

2. The process according to claim 1, wherein the surface-treated natural calcium carbonate is prepared as an aqueous suspension having a pH of greater than 6.5, measured at 20° C.

3. The process according to claim 1, wherein the natural calcium carbonate is marble, calcite, chalk, dolomite, limestone or mixtures thereof.

4. The process according to claim 1, wherein the acid has a $pK_a$ at 25° of 2.5 or less.

5. The process according to claim 4, wherein the acid is hydrochloric acid, sulphuric acid, sulphurous acid, hydrosulphate, phosphoric acid, oxalic acid or mixtures thereof.

6. The process according to claim 1, wherein the natural calcium carbonate is treated with the acid and the carbon dioxide in the presence of at least one silicate and/or silica, aluminium hydroxide, earth alkali metal aluminate, magnesium oxide, or mixtures thereof.

7. The process according to claim 6, wherein the at least one silicate is an aluminium silicate, a calcium silicate, or an alkali metal silicate.

8. The process according to claim 1, wherein the surface-treated natural calcium carbonate has a specific surface area of from 5 $m^2/g$ to 200 $m^2/g$, measured using nitrogen and the BET method according to ISO 9277.

9. The process according to claim 1, wherein the surface-treated natural calcium carbonate has a mean grain diameter $d_{50}$ of from 0.1 to 50 μm, measured according to the sedimentation method.

10. The process according to claim 1, wherein the aqueous suspension comprising surface-treated natural calcium carbonate is stabilized with one or more dispersants.

11. The process according to claim 1, wherein the surface-treated natural calcium carbonate is used in powder form and/or in the form of granules.

12. The process according to claim 1, wherein the surface-treated natural calcium carbonate is added in an amount of 10 ppm-1 wt.-%, based on the weight of the water to be treated.

13. The process according to claim 1, wherein the pH of the water to be purified is adjusted to a value of >6.5, before being brought into contact with the surface-treated natural calcium carbonate.

14. The process according to claim 1, wherein the water to be purified is selected from the group comprising industrial waste water, drinking water, urban waste water, waste water from breweries or other beverage industries, water in the paper industry and agricultural waste-water.

15. The process according to claim 1, wherein the water to be purified contains heavy metal impurities.

16. The process according to claim 1, wherein the water to be purified contains microorganisms as impurities.

17. The process according to claim 1, wherein the water to be purified contains an endocrine disrupting compound (EDC) impurity selected from the group comprising an endogenous hormone, 17β-estradiol (E2), estrone (E1), estriol (E3), testosterone, dihydro testosterone, a phyto hormone, a myco hormone β-sitosterol, genistein, daidzein, zeraleon, a drug, 17α-ethinylestradiol (EE2), mestranol (ME), diethylstilbestrol (DES), an industrial chemical, 4-nonyl phenol (NP), 4-tert-octyl phenol (OP), bisphenol A (BPA), tributyltin (TBT), methylmercury, a phthalate, PAK or PCB.

18. The process according to claim 1, wherein the water to be purified contains activated carbon impurities.

19. The process according to claim 18, wherein the activated carbon impurities have further impurities adsorbed onto their surface.

20. The process according to claim 1, wherein the water to be purified is brought into contact with the surface-treated natural calcium carbonate by surface filtration, depth filtration and/or alluvium filtration.

21. The process according to claim 1, wherein the surface-treated natural calcium carbonate is prepared as an aqueous suspension having a pH of greater than 7.0, measured at 20° C.

22. The process according to claim 1, wherein the surface-treated natural calcium carbonate is prepared as an aqueous suspension having a pH of greater than 7.5, measured at 20° C.

23. The process according to claim 4, wherein the acid is phosphoric acid.

24. The process according to claim 1, wherein the surface-treated natural calcium carbonate has a specific surface area of from 20 $m^2/g$ to 80 $m^2/g$, measured using nitrogen and the BET method according to ISO 9277.

25. The process according to claim 1, wherein the surface-treated natural calcium carbonate has a mean grain diameter $d_{50}$ of from 0.1 to 50 μm, measured according to the sedimentation method.

26. The process according to claim 1, wherein the surface-treated natural calcium carbonate is added in an amount of 100 ppm-0.5 wt.-%, based on the weight of the water to be treated.

27. The process according to claim 1, wherein the surface-treated natural calcium carbonate is added in an amount of 400 ppm-2000 ppm, based on the weight of the water to be treated.

28. The process according to claim 1, wherein the pH of the water to be purified is adjusted to a value of >7 before being brought into contact with the surface-treated natural calcium carbonate.

29. The process according to claim 1, wherein the surface-treated natural calcium carbonate with absorbed impurities is separated from the water by sedimentation or filtration.

30. The process according to claim 1, wherein the surface-treated natural calcium carbonate with absorbed impurities is separated from the water by surface filtration, depth filtration and/or alluvium filtration.

31. The process according to claim 1, wherein the water to be purified is brought into contact with the surface-treated natural calcium carbonate and the surface-treated natural calcium carbonate with absorbed impurities is separated from the water by surface filtration, depth filtration and/or alluvium filtration.

32. The process according to claim 1, wherein the carbon dioxide is formed in situ by acid treatment.

33. The process according to claim 1, wherein the carbon dioxide is supplied from an external source.

* * * * *